United States Patent

[11] 3,581,843

| [72] | Inventor | James E. Hadley<br>Wichita, Kans. |
|---|---|---|
| [21] | Appl. No. | 839,884 |
| [22] | Filed | July 8, 1969 |
| [45] | Patented | June 1, 1971 |
| [73] | Assignee | Miro-Flex Company, Inc. |

[54] AIRCRAFT TOW BAR
23 Claims, 4 Drawing Figs.

[52] U.S. Cl. ................................................... 182/20,
280/503
[51] Int. Cl. ........................................... B60d 1/00,
B60d 3/00, F06f 1/00
[50] Field of Search ............................................. 182/20, 21,
169; 280/503, 493, 494; 294/16

[56] References Cited
UNITED STATES PATENTS
| 1,539,474 | 5/1925 | Falk | 280/503 |
| 2,391,608 | 12/1945 | Wood | 280/503 |
| 2,449,680 | 9/1948 | Wak | 280/503 |
| 3,132,886 | 5/1964 | Meek | 280/503 |

*Primary Examiner*—Reinaldo P. Machado
*Attorney*—Hofgren, Wegner, Allen, Stellman & McCord ABSTRACT: An aircraft tow bar of light weight, tubular material which includes a fork member adapted to be engaged with a part of an aircraft landing gear, and a draft handle pivotally joined to the fork member by a transverse bar which is near the bight of the fork member so the handle may be extended for towing or folded alongside the fork for storage. The dimensions of the fork member and draft handle are such that when folded their respective free ends are in juxtaposition for compact storage; or when positioned at an acute angle to one another their free ends may be placed upon the ground to provide a stable ladder in which the transverse pivot bar serves as a step which may be readily mounted by a person standing on the ground.

AIRCRAFT TOW BAR

BACKGROUND OF THE INVENTION

This invention relates to an improved tow bar for light aircraft which is usable as a stepladder.

Light aircraft usually must be manhandled in or out of a hangar, or into a position where they may be lashed to posts for outdoor parking; and tow bars are used for this purpose. The prior art aircraft tow bars have suffered from several disadvantages; among which are their use of expensive and complex mechanisms for attaching them to an aircraft, their cumbersome nature in use, and in some cases the likelihood that movable parts may jam. Furthermore, with one exception such devices are not collapsible for compact storage in an aircraft; and the one exception is sufficiently awkward to use that one person cannot practically attach it to an aircraft and extend it for use.

No prior art tow bar may be folded for compact storage or for alternate use as a stepladder.

SUMMARY OF THE INVENTION

The principle object of the present invention is to provide a mechanically simple, lightweight aircraft tow bar which may be folded for compact storage in a light aircraft.

Another major object is to provide a tow bar which may be alternately used as a stepladder.

As will more fully appear from the detailed description, these objects are achieved by providing a device in which a fork member has relatively long arms which are sufficiently resilient that they may springingly engage a part of an aircraft landing gear, thus avoiding any mechanical means for this purpose; by connecting a draft handle to the fork on a transverse pivot so that the handle may be folded alongside the fork or extended for towing; and by so proportioning the fork and handle that when they are positioned at an acute angle to one another and placed with their respective free ends on the ground they provide a stable ladder in which the transverse pivot forms a step which may be readily mounted by a person standing on the ground.

Further objects will become more fully apparent in the following description of the embodiment of this invention and from the appended claims.

DESCRIPTION OF THE DRAWINGS

In the drawings:

FIG. 4 is a fragmentary side elevational view of one end portion of the pivotal connection between the draft handle and the fork member, taken substantially as indicated by the line 4—4 of FIG. 2.

DESCRIPTION OF THE PREFERRED EMBODIMENT

Figure 1:
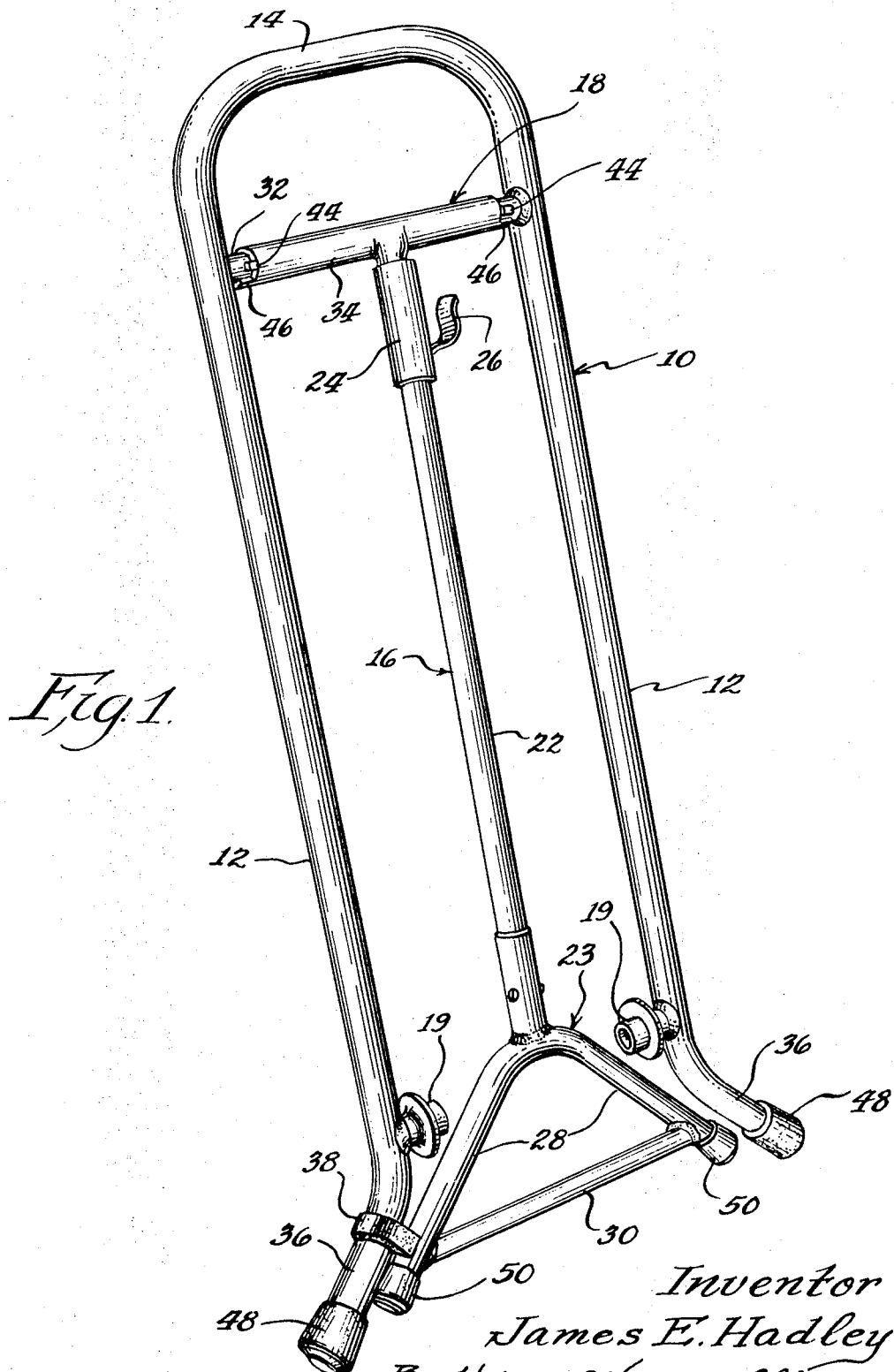
FIG. 1 is a perspective view of an aircraft tow bar embodying the invention, folded to a storage position.
Figure 2:
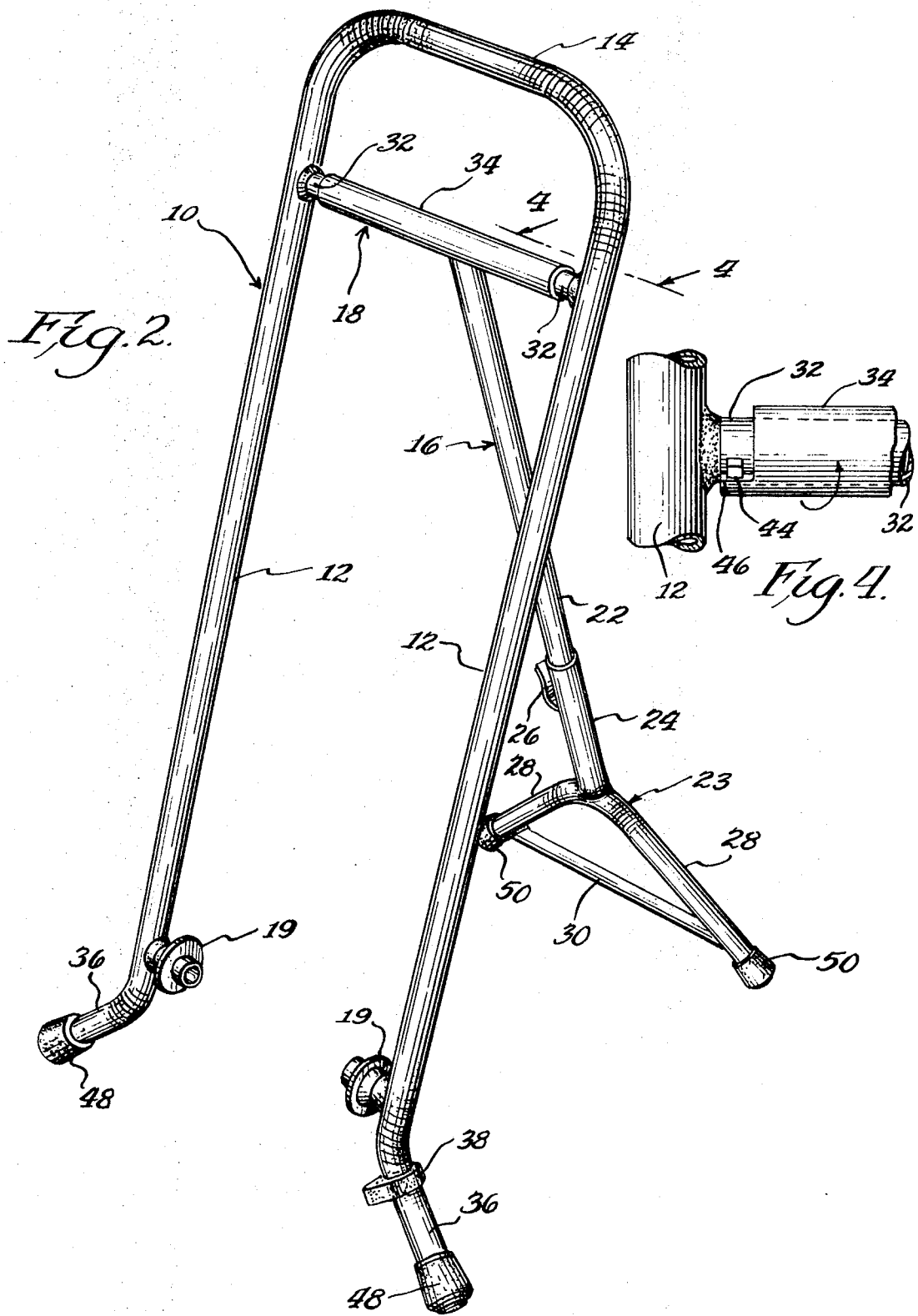
FIG. 2 is a perspective view of the tow bar in a ladder-forming position.
Figure 3:
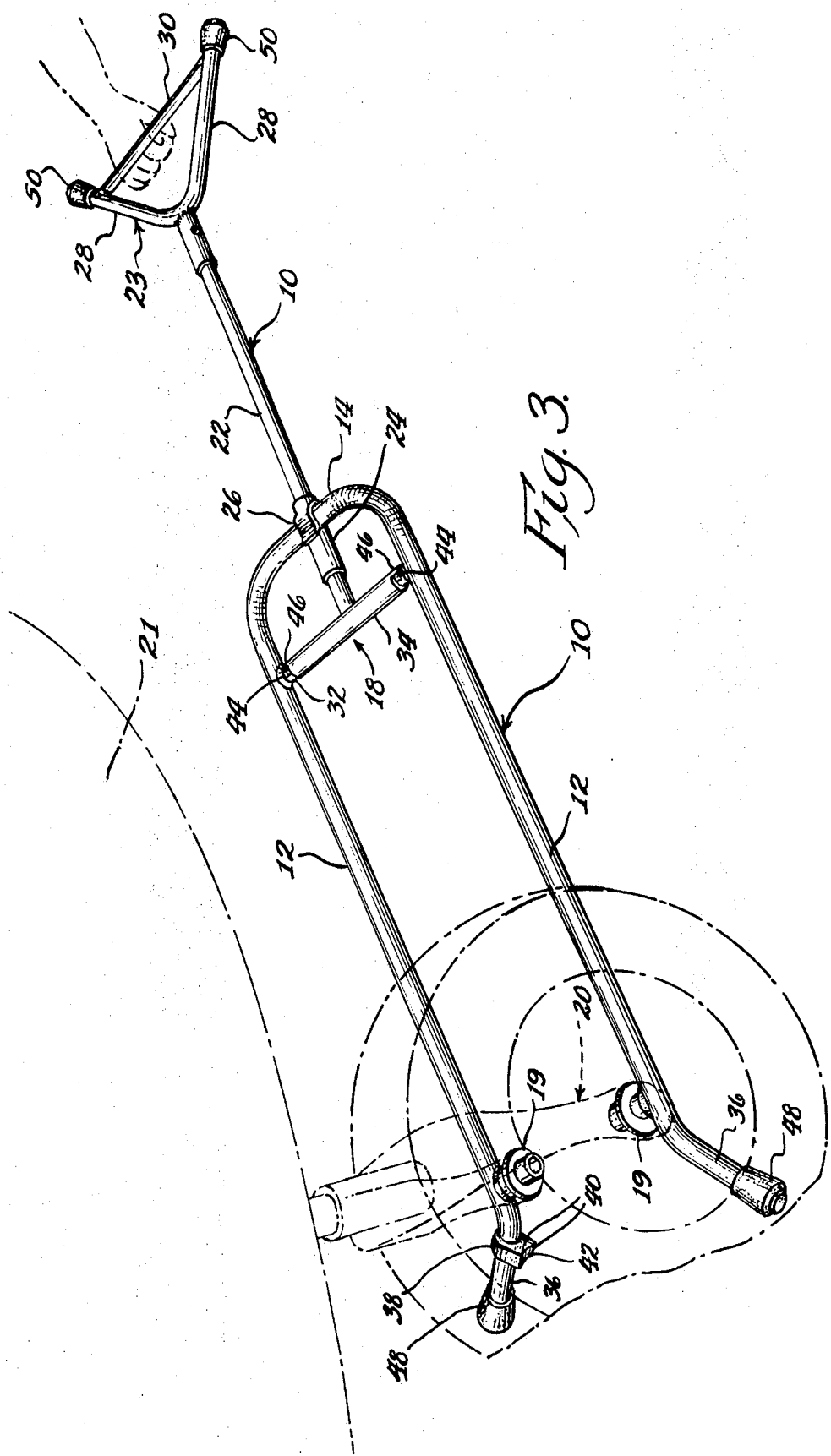
FIG. 3 is a perspective view of the tow bar in position for use in towing, a part of an aircraft landing gear being illustrated in broken lines.

Turning now to FIGS. 1, 2 and 3, a fork member, generally designated 10, is fabricated from metal tubing and has a pair of generally parallel resilient arms 12 and a bight portion 14. A draft handle, generally designated 16, also fabricated from metal tubing, has its inner end foldably joined to the fork member 10 on a pivotal connection generally designated 18.

As illustrated in FIG. 3, the span across the arms 12 is such that connecting means 19, which in the drawing constitutes a pair of cups mounted on the inner sides of the fork member arms 12 adjacent their free ends, is adapted to be engaged with the sides of a landing gear element, in this case a nosewheel generally designated 20, of an airplane generally designated 21, by springing the fork member arms 12. Thus, the length of the arms must be so related to the resilience of the tubing as to permit such springing engagement. The precise structure of the connecting means 19 must be varied to provide for engagement with different types of landing gears. Thus, for example, some nosewheel assemblies which have hexagonal recesses at their ends, and for such a landing gear hex-shaped studs are used instead of cups.

The draft handle 16 has a rod 22 and handgrasping means, generally designated 23, at its outer end. A ring 24 is slidably mounted on the draft handle 16, and as seen in FIG. 3 a clip 26 mounted on the ring 24 is adapted to engage the bight portion 14 of the fork member 10 to prevent relative pivotal movement of the draft handle 16 and the fork member 10 in case it is necessary to push the aircraft to maneuver it during towing.

The handgrasping means 23 has diverging tines 28 secured to and forming a generally Y-shaped member with the rod 22, and a crossbar 30 connecting the tines 28 for holding the tow bar while towing the aircraft 21.

As illustrated in FIGS. 1, 2 and 3 the pivotal connection 18 has a fixed transverse bar 32 extending between the fork member arms 12 and secured to the inner sides of the arms remote their free ends, with sufficient space between the bar 32 and the bight portion 14 of the fork member 10 for entry of a user's foot between them. A sleeve 34 secured to the inner end of the draft handle 18 and flanking the handle is journaled on the transverse bar 32 to allow pivotal movement of the draft handle 16 relative to the fork member 10.

The lengths of the draft handle 16 and of fork member arms 12 are substantially equal measured from the pivotal connection 18 to their respective ends. The span of the draft handle tines 28 is greater than the width of the fork member arms 12 measured across the pivotal connection 18. The arms 12 have diverging end portions 36 to allow the handle tines 28 to nest between them when the tow bar is folded.

A rubber sleeve 38 is mounted on the diverging outer end portion 36 of a fork arm 12. The sleeve 38 frictionally grips the form arm 12, but may be turned about the fork arm. As illustrated in FIG. 3, the sleeve 38 has integral protuberances 40 which define a shallow recess 42 adapted to selectively engage a handle tine 28. As illustrated in FIG. 1, the draft handle 16 may be folded between the fork arms 12 and held in position through engagement of the rubber sleeve 38 on the handle tine 28. Thus, the tow bar is folded into compact dimensions for convenient storage in the airplane 21.

The rubber sleeve 38 may be twisted slightly to either side to allow free passage of the draft handle 16 between the fork arms 12.

As illustrated in FIG. 2, the draft handle 16 may be pivoted to a position defining an acute angle with respect to the plane of the fork arms 12, and in that position the device provides a ladder. As illustrated in FIGS. 1 and 3, outwardly extending stop pins 44 are mounted on the transverse bar 32 adjacent its ends. The sleeve 34 has extensions 46 on its ends which engage the pins 44 to limit pivotal movement of the sleeve 34 on the transverse bar 32, as best seen in FIG. 4. The arrangement is such that the interengaging sleeve extensions 46 and pins 44 prevent pivotal movement of the draft handle 16 beyond the ladder-forming position of FIG. 2. When the device is folded as seen in FIG. 1 the draft handle is pivoted to the right to place it in a ladder-forming position or to the left to place it in towing position.

As illustrated in FIG. 2, the free ends of the fork arms 12 and the handle tines 28 when placed on the ground form a stable ladder, the transverse bar 32 serving as a step which may be readily mounted by a user standing at ground level. The widely spaced ends of the diverging end portions 36 of the fork member arms 12 and of the handle tines 28 provide stability for the stepladder. This ladder allows the user to gain ready access to the upper portion of the airplane 21 for purposes such as checking fuel level in wing tanks of a high wing monoplane.

A pair of rubber caps 48 are mounted on the ends of the fork member arms 12 and a pair of rubber caps 50 are mounted on the ends of the handle tines 28 to prevent slippage of the device during use as a stepladder.

The foregoing detailed description is given for clearness of understanding only, and no unnecessary limitations should be understood therefrom, as modifications will be obvious to those skilled in the art.

I claim:

1. An aircraft tow bar comprising, in combination: a fork member having a bight portion and a pair of generally parallel arms; connecting means adjacent the free ends of said arms to engage the sides of an aircraft landing gear element; a draft handle having handgrasping means at its outer end for holding the tow bar while towing the aircraft; and a pivotal connection foldably joining the inner end of said draft handle to the fork member, said pivotal connection comprising transverse bar means secured to the fork member arms remote from the free ends of said arms, and sleeve means at the inner end of the draft handle, said sleeve means being journaled on the bar means.

2. The combination of claim 1 in which the fork member arms are resilient and are sufficiently long that they may be manually sprung to engage the connecting means with the sides of an aircraft landing gear element.

3. The combination of claim 1 in which the bar means comprises a single bar mounted between the fork member arms, in which the draft handle comprises rod means having the sleeve means fixedly connected to its inner end, and in which the handgrasping means extends transversely at the outer end of said rod means.

4. The combination of claim 2 in which said rod means comprises a signal rod having the sleeve means flanking its inner end, and in which the handgrasping means comprises diverging tines forming a generally Y-shaped member with the rod, and a crossbar connecting said tines.

5. The combination of claim 3 in which the lengths of the draft handle and of the fork member arms are substantially equal measured from the pivotal connection to their respective ends, the span of the draft handle tines is greater than the width of the fork member arms across said pivotal connection, and the outer end portions of said fork member arms diverge sufficiently to allow said handle tines to nest between them when the tow bar is folded.

6. The combination of claim 1 in which the lengths of the draft handle and of the fork member arms are substantially equal measured from the pivotal connection to their respective ends, and in which the transverse bar means is spaced from the bight of the fork member a sufficient distance for entry of a user's foot between them, means on the draft handle and on the fork arms which may interengage when said handle and fork are at an acute angle to each other to form a stable ladder with the free ends of the arms and of the handle tines on the ground, the transverse bar means in said position serving as a step which may be readily mounted by a user standing at ground level.

7. The combination of claim 5 including antiskid caps on the ends of the fork arms and the handle tines.

8. An aircraft tow bar and step device comprising, in combination: a fork member having a bight portion and a pair of arms the free ends of which are widely spaced to provide support elements; means adjacent said free ends of said arms engageable with the sides of an aircraft landing gear element; a draft handle having widely spaced foot members at its free end and handgrasping means at said end for holding during use as a tow bar; a pivotal connection foldably joining the inner end of said draft handle to the fork member for pivotal movement between a folded position with the free end of the draft handle adjacent the free ends of the fork member arms, a towing position with the draft handle at a substantially straight angle to the fork member, and a ladder-forming position with the draft handle at an acute angle to the fork member, said draft handle and said fork member being of substantially equal length measured from the pivotal connection to their respective free ends so that in said ladder-forming position the support elements of the fork member and the foot members of the handle may stand on the ground to provide a stable ladder; and transverse bar means serving as a step which may be readily mounted by a user standing at ground level when the device is in said ladder-forming position.

9. The combination of claim 8 in which the pivotal connection includes stop means to obstruct pivotal movement of the draft handle at an acute angle to the fork member in the ladder-forming position.

10. The combination of claim 8 including means selectively locking the draft handle to the fork member in a towing position for preventing relative pivotal movement of the draft handle and fork member during use as a tow bar.

11. The combination of claim 8 including means for selectively locking the draft handle to the fork member in a folded position for storage of the tow bar.

12. The combination of claim 8 in which the pivotal connection includes said transverse bar means which is secured to the fork member arms remote from the free ends of said arms, and sleeve means at the inner end of the draft handle, said sleeve means being journaled on the bar means.

13. The combination of claim 12 in which the bar means comprises a single bar mounted between the fork member arms, and in which the draft handle comprises a single rod having the sleeve means flanking its inner ends.

14. The combination of claim 8 in which the fork member arms are resilient and are sufficiently long that they may be manually sprung to engage the connecting means with the sides of an aircraft landing gear element.

15. The combination of claim 8 including interengaging means on the fork and draft handle to stabilize them in the ladder-forming position.

16. An aircraft tow bar comprising, in combination: a fork member having a bight portion and a pair of generally parallel arms; connecting means adjacent the free ends of said arms to engage the sides of an aircraft landing gear element; a draft handle having handgrasping means at its outer end for holding the tow bar while towing the aircraft; a pivotal connection foldably joining the inner end of said draft handle to the fork member; and means on the draft handle engageable with the fork member for preventing relative pivotal movement of the draft handle and fork during use as a tow bar.

17. The combination of claim claim 7 which includes a fixed transverse bar extending between the fork arms a sufficient distance from the bight portion of the fork member for entry of a user's foot therebetween, in which the lengths of the draft handle and of the fork member arms are substantially equal measured from the pivotal connection to their respective ends, and in which the draft handle is adapted to be pivoted to an acute angle to the fork member with the free ends of the fork arms and the outer end of the handle on the ground to form a stable ladder, the transverse bar in said position of the fork member and handle serving as a step which may be readily mounted by a user standing at ground level.

18. The combination of claim 8 in which the draft handle has widely spaced foot members at its outer end, and in which a crossbar connects said foot members.

19. The combination of claim 8 in which the draft handle is pivoted on the fixed transverse bar.

20. The combination of claim 8 including interengaging means on the fork and draft handle to stabilize them in the ladder-forming position.

21. The combination of claim 7 in which the pivotal connection comprises transverse bar means secured to the fork member arms remote from the free ends of said arms, and sleeve means at the inner end of the draft handle, said sleeve means being journaled on the bar means.

22. The combination of claim 12 in which the bar means comprises a single bar mounted between the fork member arms, in which the draft handle comprises rod means having the sleeve means fixedly connected to its inner end, and in which the handgrasping means extends transversely at the outer end of said rod means.

23. The combination of claim 16 in which the fork member arms are resilient and are sufficiently long that they may be manually sprung to engage the connecting means with the sides of an aircraft landing gear element.